(12) United States Patent
Lin (10) Patent No.: US 8,807,845 B2
(45) Date of Patent: *Aug. 19, 2014

(54) SHUTTER MEMBER FOR OPTICAL FIBER ADAPTER AND OPTICAL FIBER ADAPTER WITH THE SAME

(75) Inventor: I En Lin, Taipei (TW)

(73) Assignees: Protai Photonic Co., Ltd., New Taipei (TW); Senko Advanced Components, Inc., Marlborough, MA (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/491,791

(22) Filed: Jun. 8, 2012

(65) Prior Publication Data

US 2013/0071068 A1     Mar. 21, 2013

(30) Foreign Application Priority Data

Sep. 21, 2011   (CN) .......................... 2011 1 0281073

(51) Int. Cl.
*G02B 6/00*   (2006.01)
*G02B 6/38*   (2006.01)

(52) U.S. Cl.
USPC ............................................ 385/75; 385/147

(58) Field of Classification Search
USPC .................. 385/53–56, 88–93, 147
See application file for complete search history.

(56) References Cited

U.S. PATENT DOCUMENTS

| | | | |
|---|---|---|---|
| 6,461,054 B1 | 10/2002 | Iwase | |
| 8,202,009 B2 * | 6/2012 | Lin et al. | 385/55 |
| 8,491,198 B2 * | 7/2013 | Lin | 385/75 |
| 2007/0230874 A1 | 10/2007 | Lin | |
| 2009/0226141 A1 | 9/2009 | Lin et al. | |
| 2012/0321266 A1 * | 12/2012 | Lin et al. | 385/134 |
| 2013/0064517 A1 * | 3/2013 | Lin et al. | 385/134 |

* cited by examiner

*Primary Examiner* — Akm Enayet Ullah
(74) *Attorney, Agent, or Firm* — Lowe Hauptman & Ham, LLP (57) ABSTRACT

An optical fiber adapter according to the present disclosure includes a main body and an elastic shutter member. The main body has an accommodation room defined by a first wall, a second wall, a third wall and a fourth wall, wherein the first wall faces the third wall and connects with the second and fourth walls. An indentation is formed within the accommodation room and on the third wall. The shutter member includes two fixing portions positioned within the accommodation room and on the third wall, a shutter plate, a connecting portion connecting the fixing portions with the shutter plate, and a hooking portion positioned within the accommodation room. The hooking portion extends from the connecting portion to hook on to the indentation on the third wall, and the shutter plate extends from the connecting portion and into the accommodation room.

13 Claims, 13 Drawing Sheets

SHUTTER MEMBER FOR OPTICAL FIBER ADAPTER AND OPTICAL FIBER ADAPTER WITH THE SAME

CROSS REFERENCE TO RELATED APPLICATION

This application claims the priority benefit of China Patent Application Serial Number 201110281073.9 filed Sep. 21, 2011, the full disclosure of which is incorporated herein by reference.

BACKGROUND OF THE INVENTION

1. Field of the Invention

The present invention relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Figure 1:
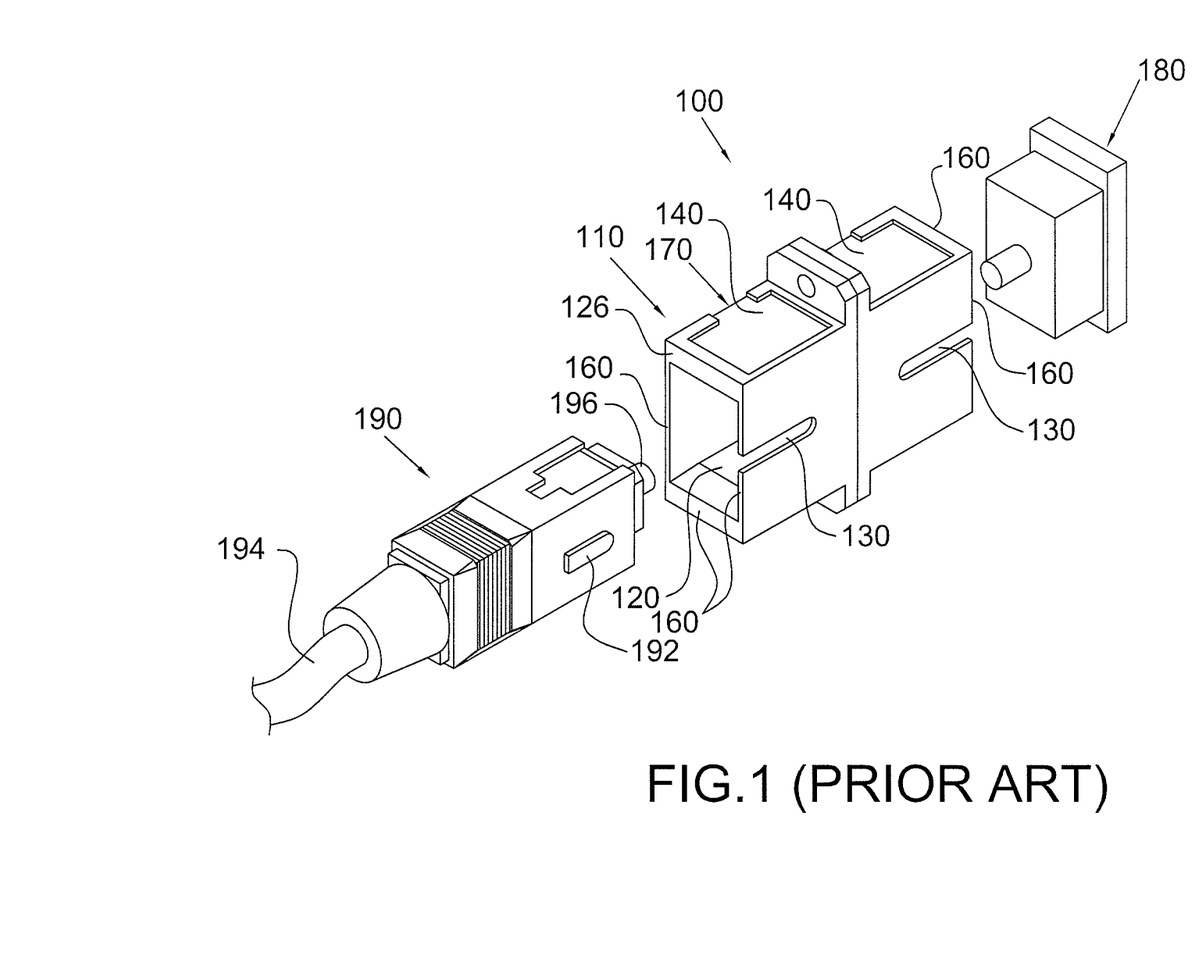
FIG. 1 is an elevated perspective view illustrating a conventional optical fiber adapter and a conventional optical fiber connector.

Referring to FIG. 1, a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

In general, the adapter 100 further has another set of side walls 160 that defines another receiving recess 120. The two receiving recesses 120 are opposite and can respectively receive a connector 190. Of course, the two receiving recesses 120 of the adapter 100 can be designed to mate with two different types of connectors. The fiber connector 190 is always attached to one end of a fiber cable 194 and a light beam can propagate down the fiber cable 194 and emit from the ferrule 196 of the connector 190. Likewise, a light beam can be coupled into the fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Figure 2:
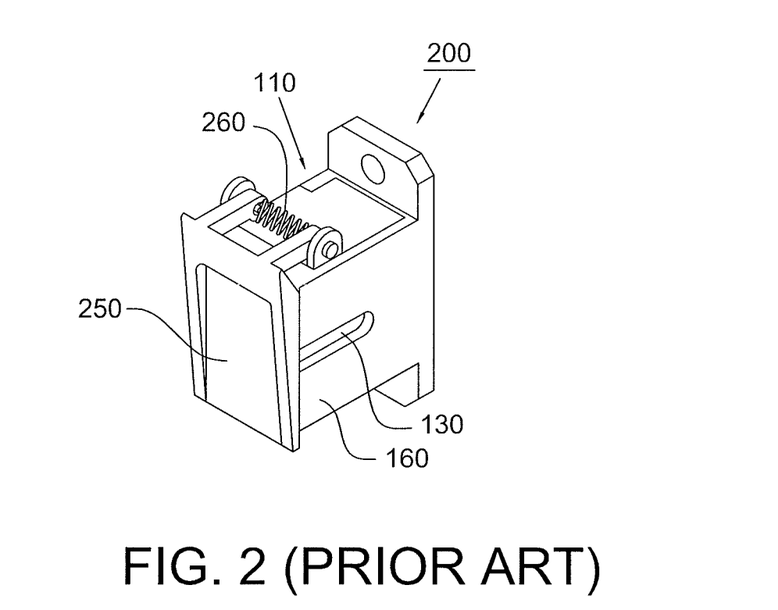
FIG. 2 is an elevated perspective view of a conventional optical fiber adapter with a cover for obstructing the light beams emitted from the receiving recess.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Figure 3:
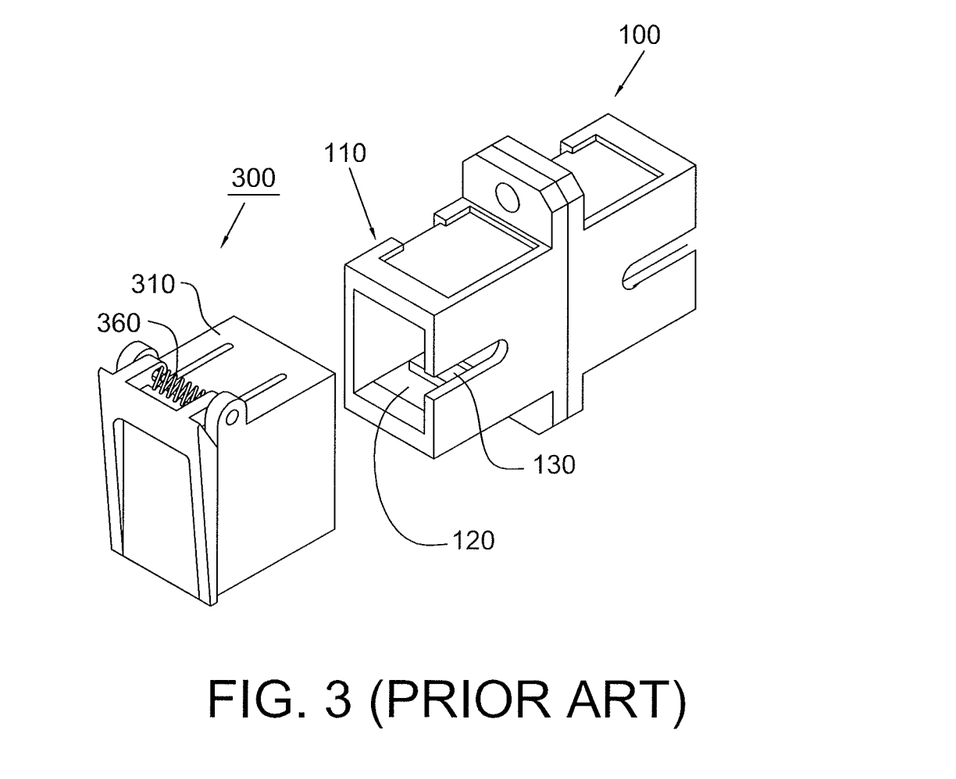
FIG. 3 is an elevated perspective view of a conventional protection cap for an optical fiber adapter.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY OF THE INVENTION

The present disclosure provides a shutter member for an optical fiber adapter that may obstruct the light beams emitted from the accommodation room thereby preventing the eyes from exposure to the light beams.

In one embodiment, the shutter member of the present disclosure includes two fixing portions; a shutter plate; a connecting portion connecting the fixing portions with the shutter plate; and a hooking portion having a horizontal portion extending from the connecting portion and a vertical portion extending from the horizontal portion.

The present disclosure further provides an optical fiber adapter, which includes a main body and an elastic shutter member. The main body has an accommodation room defined by a first wall, a second wall, a third wall and a fourth wall, wherein the first wall faces the third wall and connects with the second and fourth walls. An indentation is formed within the accommodation room and on the third wall. The shutter member includes two fixing portions positioned within the accommodation room and on the third wall, a shutter plate, a connecting portion connecting the fixing portions with the shutter plate, and a hooking portion positioned within the accommodation room. The hooking portion extends from the connecting portion to hook on to the indentation on the third wall, and the shutter plate extends from the connecting portion and into the accommodation room.

According to the present disclosure, wherein the vertical portion of the shutter member extends into the indentation on the third wall.

According to the present disclosure, wherein the hooking portion is positioned between the fixing portions.

According to the present disclosure, wherein two protrusions are formed on the third wall of the main body. Each of the protrusions includes a vertical portion extending from the third wall and a horizontal portion extending from the vertical portion, wherein a gap is formed between the horizontal portion and the third wall. Each of the fixing portions has a side and each of the sides is positioned between the third wall and the horizontal portion of one of the protrusions.

According to the present disclosure, wherein a stop protrusion is formed on the third wall to stop the fixing portions from being further moved into the accommodation room.

According to the present disclosure, wherein the shutter member is made of metal.

According to the present disclosure, wherein the optical fiber adapter is an SC type optical fiber adapter.

According to the present disclosure, wherein the indentation extends through the third wall to the outside of the accommodation room.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 4:
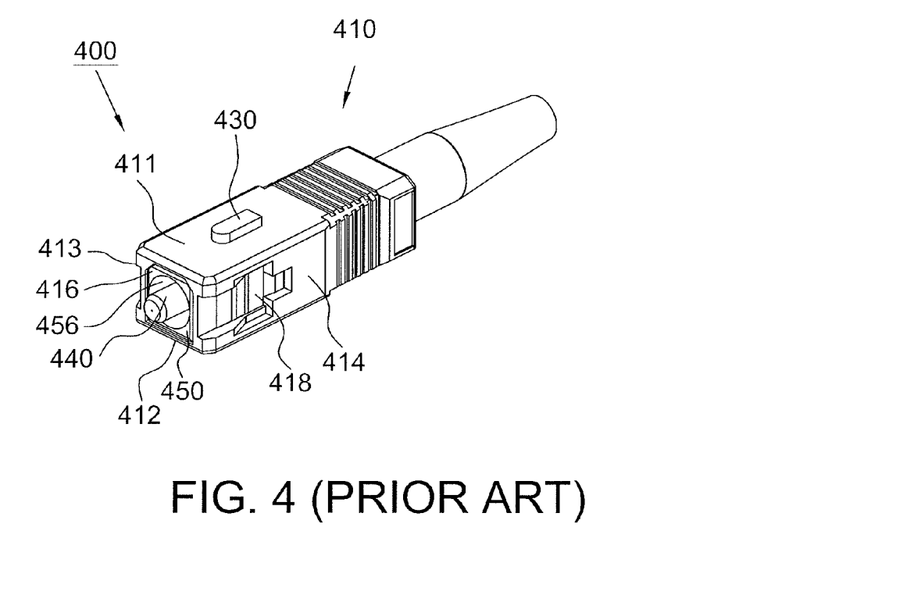
FIG. 4 is an elevated perspective view illustrating a conventional SC type optical fiber connector.

Referring to FIG. 4, a conventional SC type optical fiber connector 400 has a generally rectangular shape with a square cross section. The connector 400 includes a rectangular hollow outer housing 410 comprised of a top side-wall 411, a bottom side-wall 412, a right side-wall 413 and a left side-wall 414, wherein the right side-wall 413 is opposite to the left side-wall 414 and connects with the bottom side-wall 412 and the top side-wall 411. A protrusion 430 is formed on the top side-wall 411 and a through opening 418 is formed on each of the left and right side-walls 414, 413. A hollow inner housing 450 is placed within the outer housing 410 that may move back and forth through a rectangular opening 416 on the front end of the outer housing 410. In addition, a ferrule 440 is placed in the inner housing 450 and protrudes from a circular opening 456 on the front end of the inner housing 450 and from the opening 416 on the outer housing 410. A spring is located inside the inner housing 450 to allow the ferrule 440 to move back and forth through the openings 416, 456 (not shown in the figure).

Figure 5A:
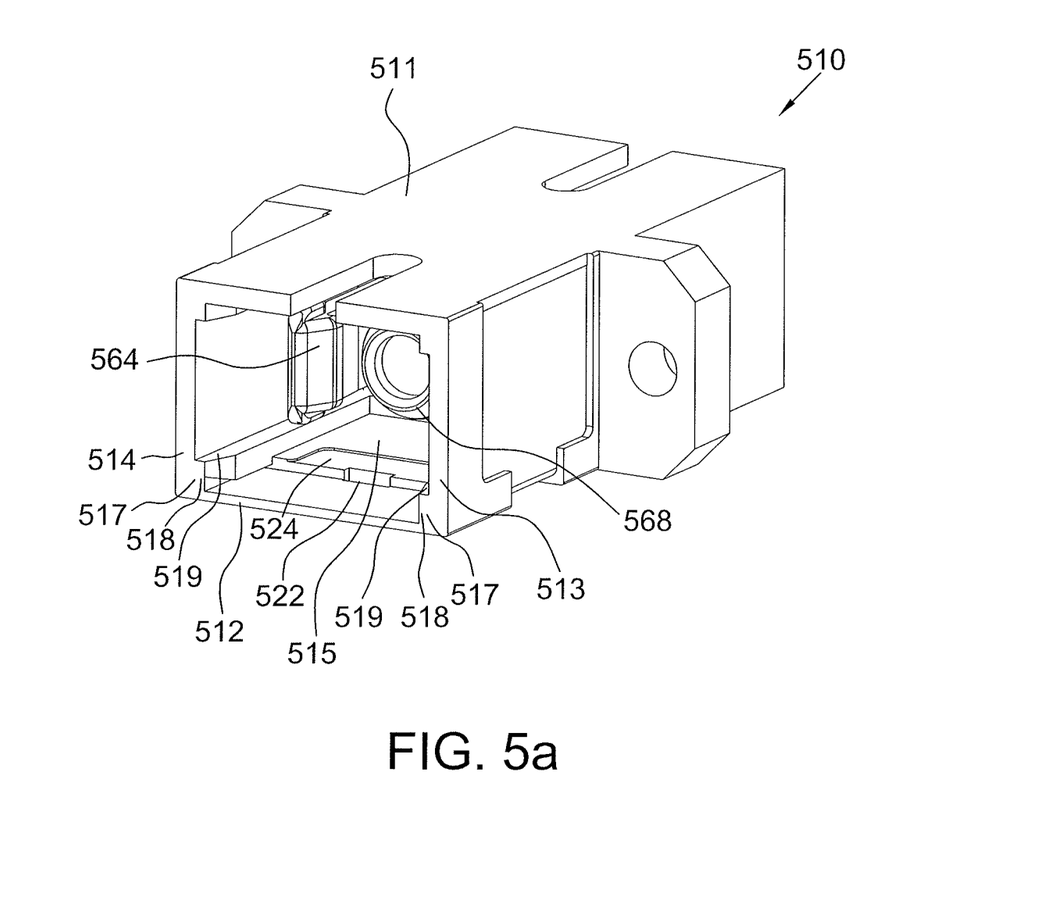
FIG. 5a is an elevated perspective view of the main body of the optical fiber adapter according to the first embodiment of the present disclosure.
Figure 5B:
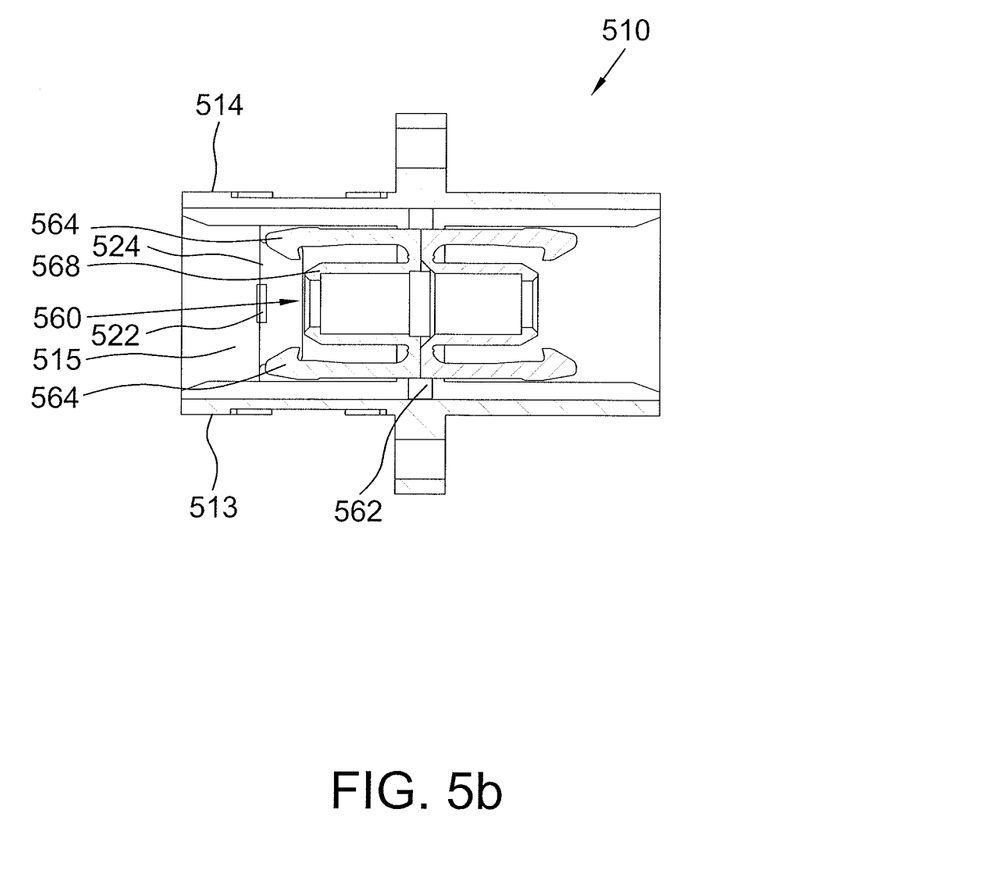
FIG. 5b is a cross-sectional view of the main body of the optical fiber adapter according to the first embodiment of the present disclosure.
Figure 6:
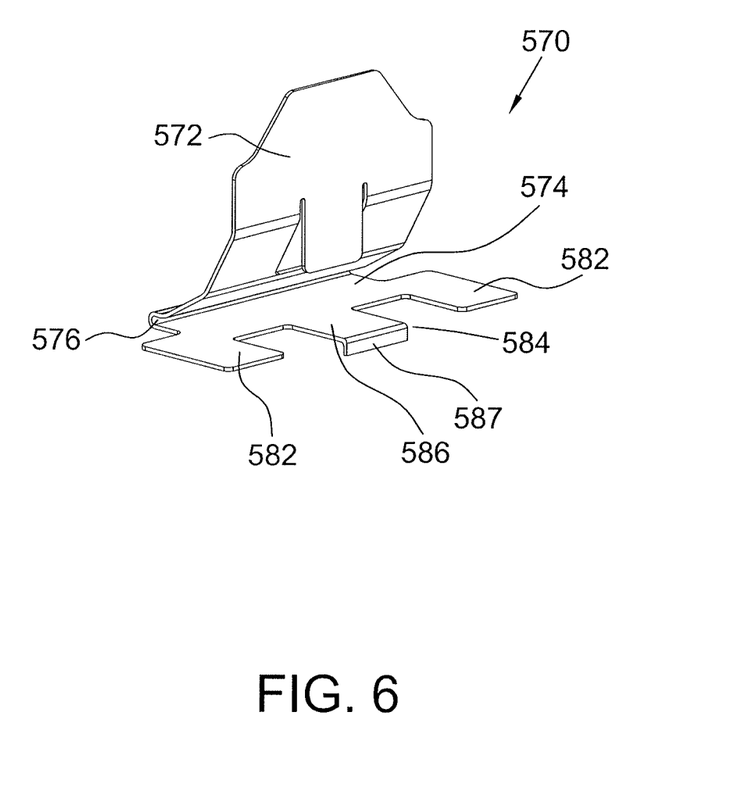
FIG. 6 is an elevated perspective view of the shutter member of the optical fiber adapter according to the first embodiment of the present disclosure.

Referring to FIGS. 5a, 5b and 6, the optical fiber adapter according to the first embodiment of the present disclosure includes a molded plastic main body 510 and an elastic shutter member 570. The main body 510 is substantially rectangular and has an accommodation room 515 defined by a top side-wall 511, a bottom side-wall 512, a right side-wall 513 and a left side-wall 514. An inner housing 560, such as a hooking member, is placed within the accommodation room 515. The hooking member 560 is provided with a pair of hooks 564 extending from one end of a generally rectangular flange 562. The flange 562 includes a hollow cylinder 568 located between the two hooks 564. A pair of protrusions 517 substantially has an inverted L shape and is formed within the accommodation room 515 and on the bottom side-wall 512. Each of the protrusions 517 includes a vertical portion 518 extending upward from the bottom side-wall 512 and a horizontal portion 519 extending horizontally from the top of the vertical portion 518. Therefore, a clear gap is formed between the horizontal portion 519 and the bottom side-wall 512. An indentation 522 is formed within the accommodation room 515 and on the bottom side-wall 512. The indentation 522 may be a through opening extending through the bottom side-wall 512 to the outside of the accommodation room 515. In addition, a stop protrusion 524 is formed on the bottom side-wall 512.

Referring to FIG. 6, the elastic shutter member 570 is integrally formed with metal. The shutter member 570 includes a shutter plate 572, two fixing portions 582, a connecting portion 574 and a hooking portion 584. The fixing portions 582 are plate-like. The connecting portion 574 connects the fixing portions 582 with the shutter plate 572 and is generally C-shaped. That is, the connecting portion 574 is curved and has a notch 576. The shutter plate 572 may contain a single plate or double plates. The shutter plate 572 may move with respect to the fixing portions 582 and the angle between the above two elements is smaller than 90 degrees. The shutter plate 572 is moved close to the fixing portions 582 with a push force and quickly moves back when the push is withdrawn. The hooking portion 584 extends from the connecting portion 574 and is positioned between the fixing portions 582. The hooking portion 584 includes a horizontal portion 586 extending horizontally from the connecting portion 574 and a vertical portion 587 extending downward from the horizontal portion 586.

Figure 7:
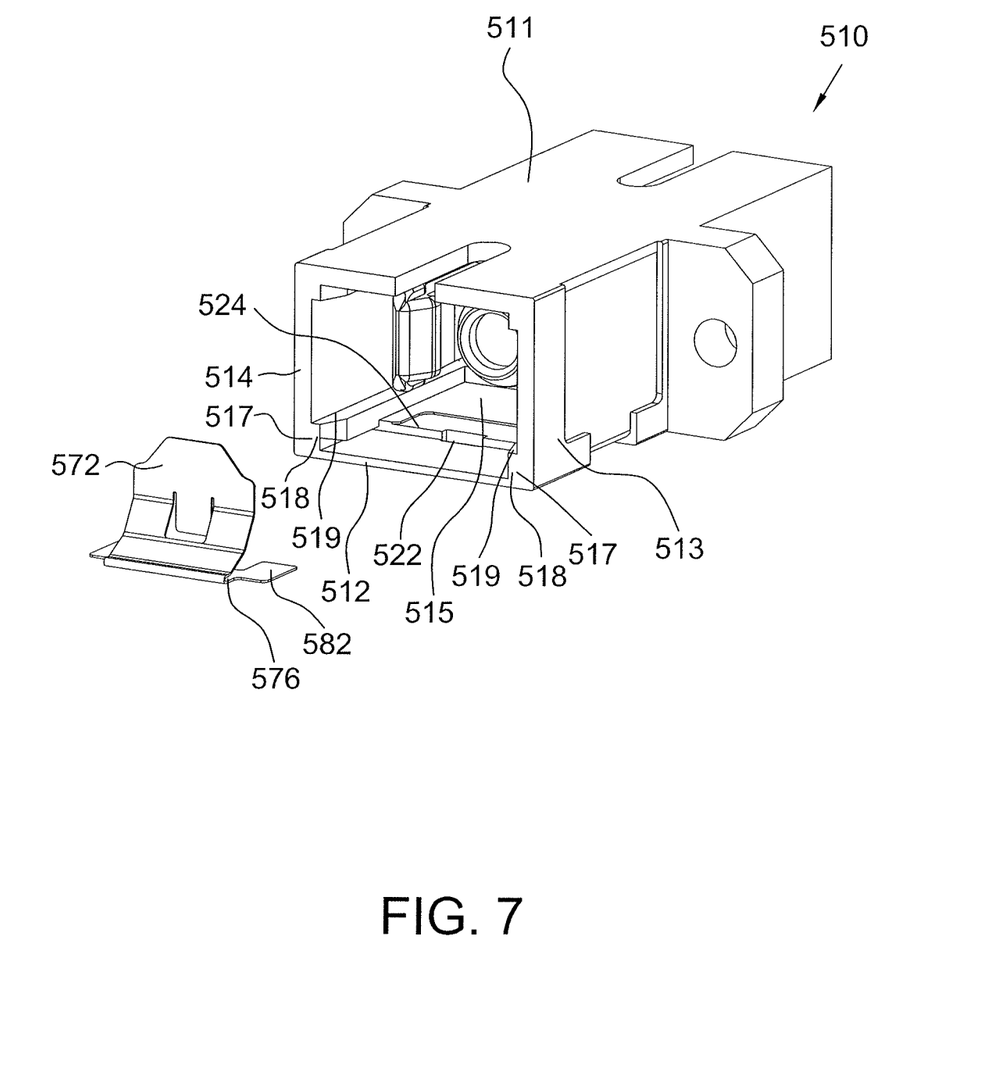
FIG. 7 is an elevated perspective view of the optical fiber adapter according to the first embodiment of the present disclosure, wherein the shutter member is separated from the main body.
Figure 8:
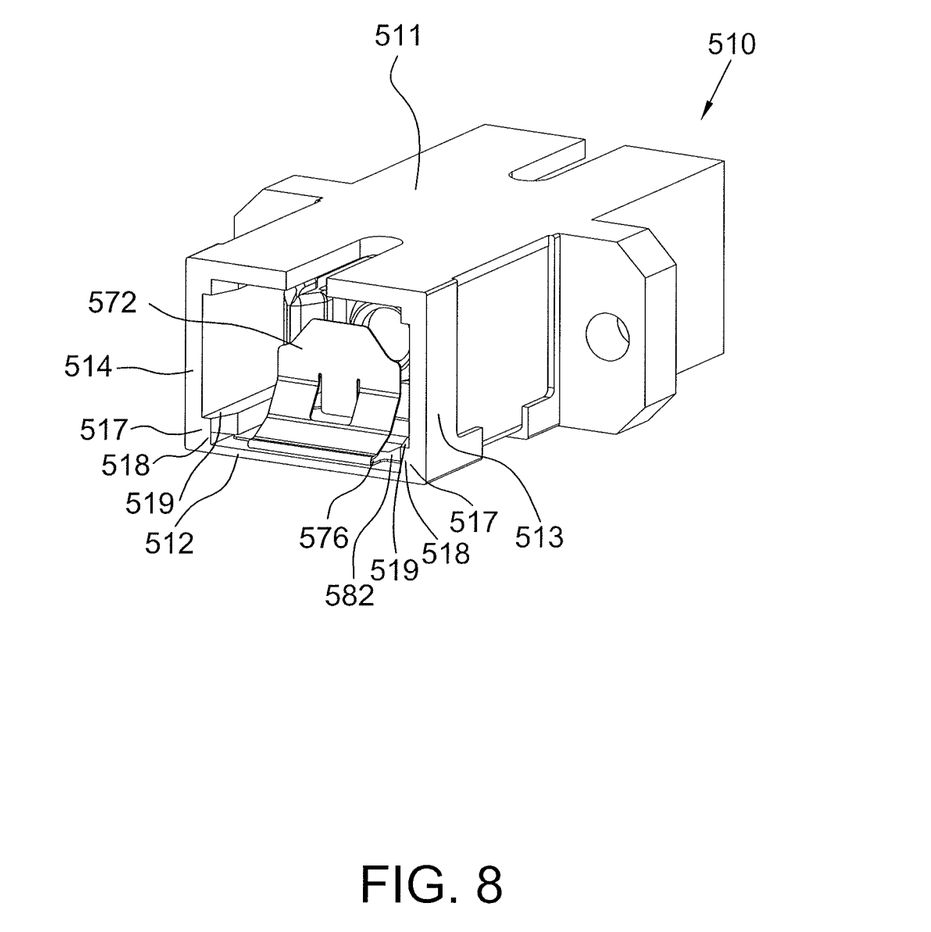
FIG. 8 is an elevated perspective view of the optical fiber adapter according to the first embodiment of the present disclosure.

Referring to FIGS. 7 and 8, when desiring to install the shutter member 570 in the main body 510, the shutter member 570 is pushed into the accommodation room 515 such that a side of each of the fixing portions 582 is positioned between the horizontal portion 519 of one of the protrusions 517 and the bottom side-wall 512, and the vertical portion 587 of the hooking portion 584 extends into the indentation 522.

According to the optical fiber adapter of the present disclosure, the hooking portion 584 will hook on to the indentation 522 when a pull force is exerted on the shutter member 570. Consequently, the hooking portion 584 may prevent the shutter member 570 from being pulled out of the main body 510. Furthermore, the stop protrusion 524 formed on the bottom side-wall 512 may stop the fixing portions 582 from being further pushed toward the flange 562 of the inner housing 560. This may prevent the hooking portion 584 from bumping against the inner housing 560.

According to the optical fiber adapter of the present disclosure, the shutter plate 572 will be located in front of the opening of the hollow cylinder 568 when the shutter member 570 is positioned in place. This way the light beams emitted from the cylinder 568 may be obstructed thereby preventing a user's eyes from exposure to the harmful light beams.

Figure 9:
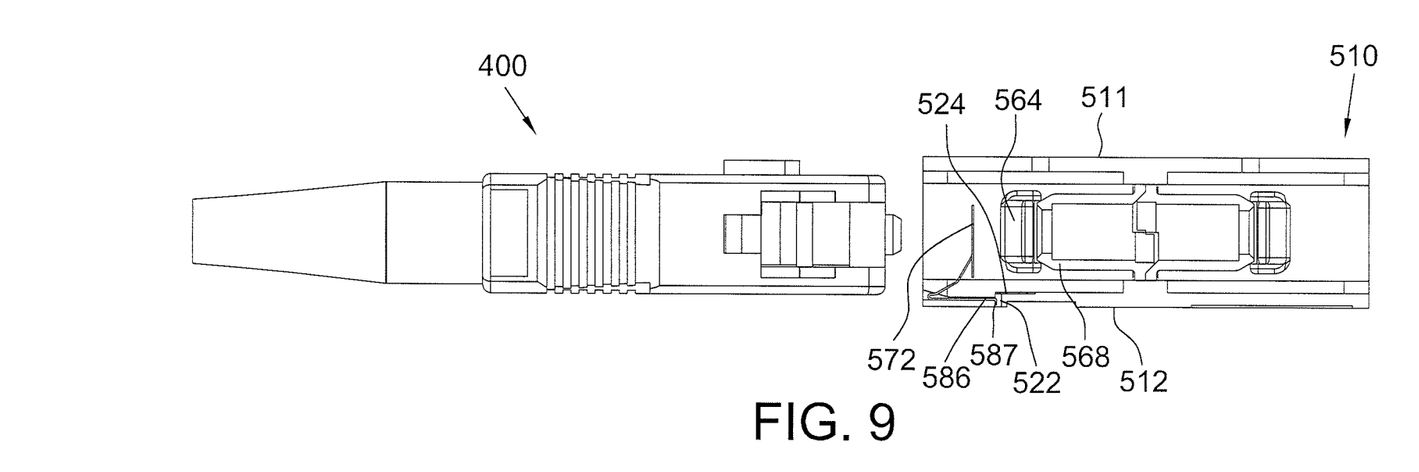
FIGS. 9 and 10 illustrate how to mate an optical fiber connector with the optical fiber adapter according to the first embodiment of the present disclosure.
Figure 10:
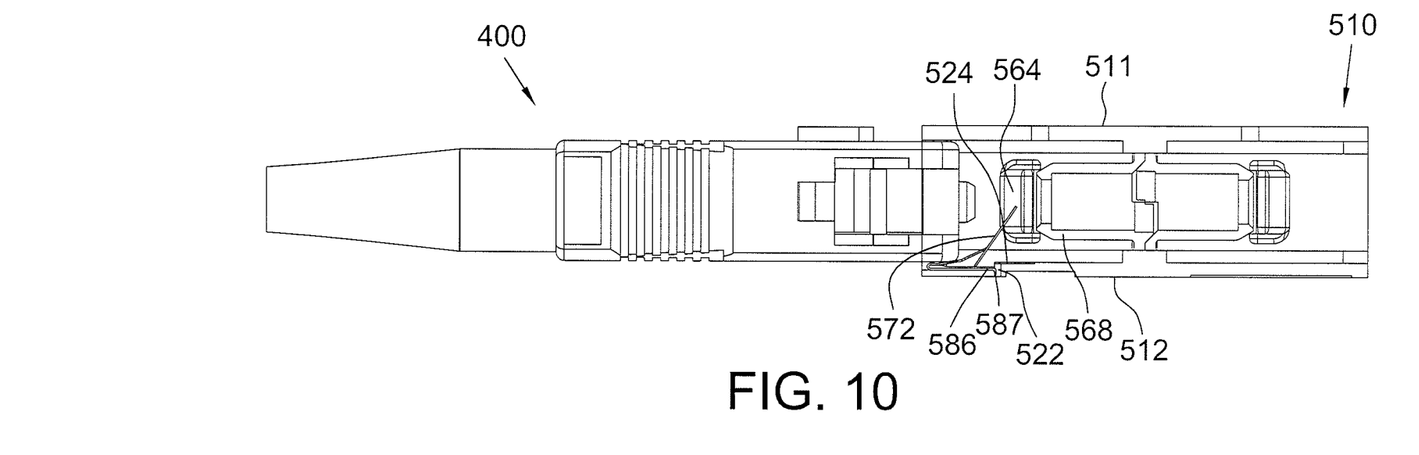

Referring to FIGS. 9 and 10, according to the optical fiber adapter of the present disclosure, there is no need to detach the shutter member 570 from the main body 510 prior to inserting the optical fiber connector 400 into the main body 510. When the connector 400 is inserted into the main body 510, it will push down the elastic shutter plate 572 to the gap between the connector 400 and the bottom side-wall 512 of the main body 510. Upon pulling out the connector 400, the elastic shutter plate 572 will quickly spring up to an original position to obstruct the light beams emitted from the cylinder 568 as a result of elasticity. As a result, the occurrence of exposure to the harmful light beams may be avoided.

According to the optical fiber adapter of the present disclosure, the sides of the fixing portions 582 are positioned under the horizontal portions 519 of the protrusions 517. This may prevent the shutter member 570 from being pulled upward from the bottom side-wall 512.

Figure 11:
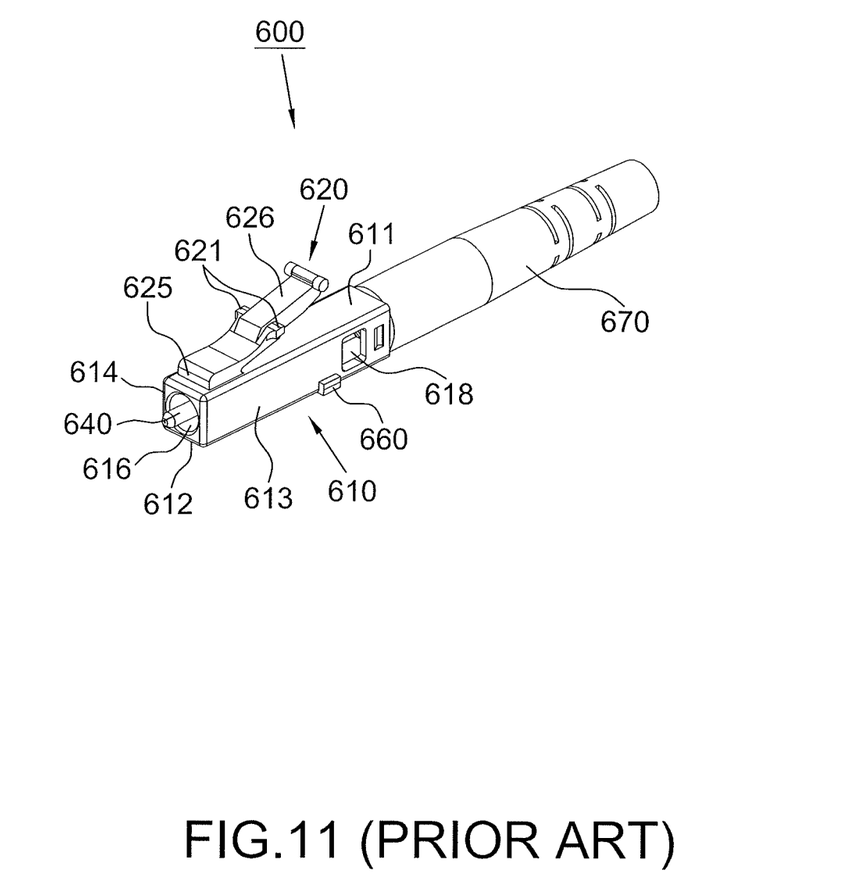
FIG. 11 is an elevated perspective view illustrating a conventional LC type optical fiber connector.

Referring to FIG. 11, a conventional LC type optical fiber connector 600 has a generally rectangular shape with a square cross section. The connector 600 includes a rectangular hollow housing 610 comprised of a top side-wall 611, a bottom side-wall 612, a right side-wall 613 and a left side-wall 614, wherein the right side-wall 613 faces the left side-wall 614 and connects with the bottom side-wall 612 and the top side-wall 611. A latch 620 is molded into the top side-wall 611 and includes a living hinge 625 which allows a tab 626 to be moved up and down in a direction perpendicular to the central axis of the connector 600. The latch 620 includes a pair of protrusions 621 that are positioned on opposing sides of the tab 626. In addition, a ferrule 640 protrudes from a circular opening 616 on the front end of the housing 610. A spring is located inside the housing 610 to allow the ferrule 640 to move back and forth through the opening 616 (not shown in the figure). A pair of protrusions 660 is positioned on the right side-wall 613 and left side-wall 614, respectively. A rectangular opening 618 is formed on each of the right side-wall 613 and left side-wall 614. A boot 670 extends from a rear end of the housing 610.

Figure 12:
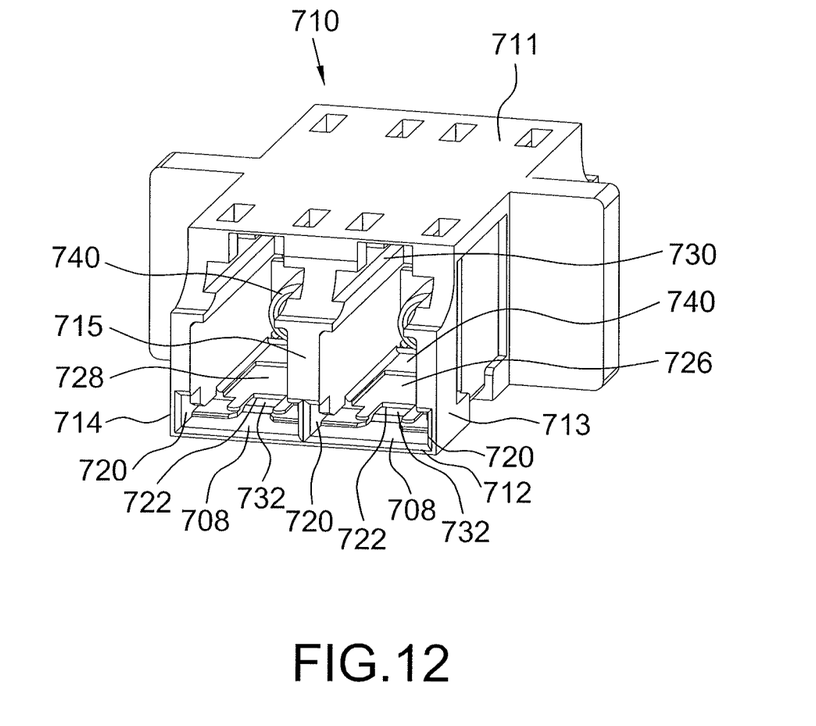
FIG. 12 is an elevated perspective view of the main body of the optical fiber adapter according to the second embodiment of the present disclosure.
Figure 13:
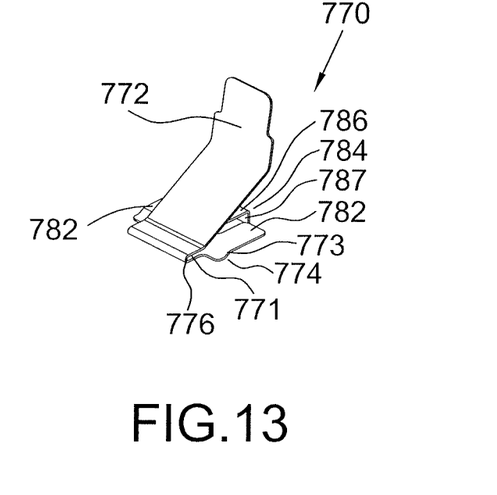
FIG. 13 is an elevated perspective view of the shutter member of the optical fiber adapter according to the second embodiment of the present disclosure.

Referring to FIGS. 12 and 13, the optical fiber adapter according to the second embodiment of the present disclosure includes a molded plastic main body 710 and an elastic shutter member 770. The main body 710 has an accommodation room defined by a top side-wall 711, a bottom side-wall 712, a right side-wall 713 and a left side-wall 714. The accommodation room is divided into two halves by a compartment wall 715 that is parallel to the right side-wall 713 and left side-wall 714 and connects with the top side-wall 711 and bottom side-wall 712. The half of the accommodation room defined by the top side-wall 711, bottom side-wall 712, compartment wall 715 and right side-wall 713 is named as the right accommodation room 726 and the other half of the accommodation room defined by the top side-wall 711, bottom side-wall 712, compartment wall 715 and left side-wall 714 is named as the left accommodation room 728. Each of the right and left accommodation rooms 726, 728 has an opening 708. A pair of indentations 720 mating with the protrusions 660 on the connector 600 is arranged in the left accommodation room 728 on the left side-wall 714 and compartment wall 715, respectively. Similarly, the indentations 720 are also arranged in the right accommodation room 726 on the right side-wall 713 and compartment wall 715, respectively. In addition, an indentation 722 is formed within each of the right and left accommodation rooms 726, 728 and on the bottom side-wall 712. The indentations 722 may be through openings extending through the bottom side-wall 712 to the outside of the accommodation rooms 726, 728, respectively. A protrusion 732 is formed within each of the right and left accommodation rooms 726, 728 and on the bottom side-wall 512. The protrusions 732 are positioned between the indentations 722 and the openings 708 of the right and left accommodation rooms 726, 728, respectively.

When the connector 600 of FIG. 11 is fully inserted into the optical fiber adapter of the second embodiment through either of the openings 708, the protrusions 660 on the connector 600 will be placed in the indentations 720. Two hollow cylinders 740 are axially positioned in the right and left accommodation rooms 726, 728 respectively to receive the ferrule 640 of the connector 600. In addition, the optical fiber adapter of the second embodiment further includes reciprocal locking mechanisms 730 which, referring to FIG. 11, mate with the latch 620, thereby securely interlocking the connector 600 with the adapter of the second embodiment when the connector 600 is completely inserted into the adapter. Afterward, a press on the tab 626 is necessary in order to pull the connector 600 out from the adapter of the second embodiment.

Referring to FIG. 13, the elastic shutter member 770 is integrally formed with metal. The shutter member 770 includes a shutter plate 772, two fixing portions 782, a connecting portion 774 and a hooking portion 784. The fixing portions 782 are plate-like. The connecting portion 774 connects the fixing portions 782 with the shutter plate 772 and is generally C-shaped. That is, the connecting portion 774 is curved and has a notch 776. The connecting portion 774 includes a horizontal portion 771 connecting with the shutter plate 772 and an upward portion 773 extending upward from the horizontal portion 771. The shutter plate 772 may contain a single plate or double plates. The shutter plate 772 may move with respect to the fixing portions 782 and the angle between the above two elements is smaller than 90 degrees. The shutter plate 772 is moved close to the fixing portions 782 with a push force and quickly moves back when the push is withdrawn. The hooking portion 784 connects with the upward portion 773 of the connecting portion 774 and is positioned between the fixing portions 782. The hooking portion 784 includes a horizontal portion 786 extending horizontally from the upward portion 773 of the connecting portion 774 and a vertical portion 787 extending downward from the horizontal portion 786.

Figure 14:
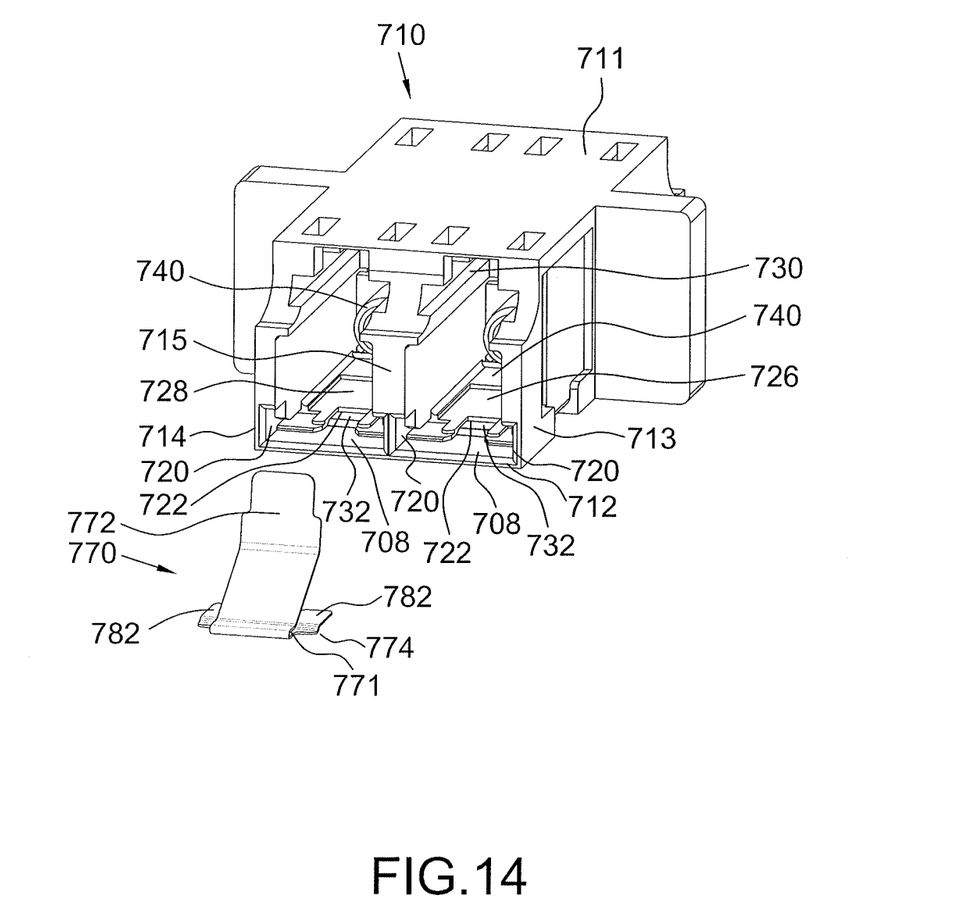
FIG. 14 is an elevated perspective view of the optical fiber adapter according to the second embodiment of the present disclosure, wherein the shutter member is separated from the main body.
Figure 15:
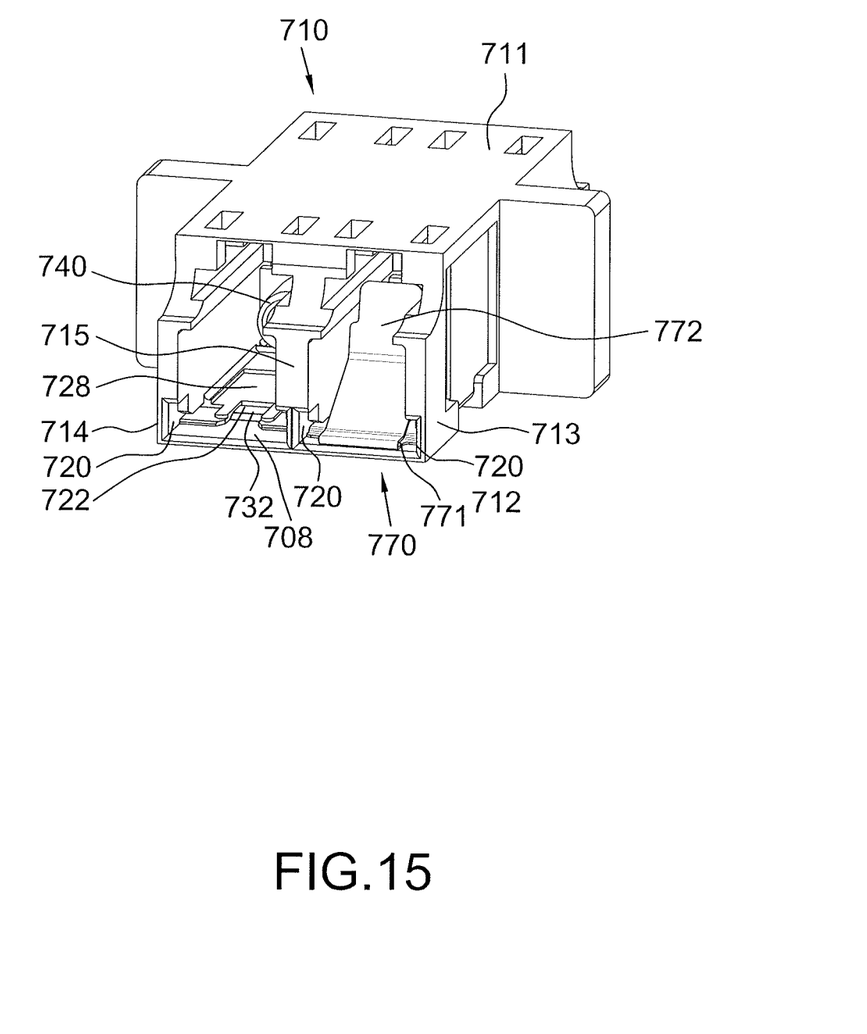
FIG. 15 is an elevated perspective view of the optical fiber adapter according to the second embodiment of the present disclosure.

Referring to FIGS. 14 and 15, when desiring to install the shutter member 770 in the main body 610, the shutter member 770 is pushed into either of the right and left accommodation rooms 726, 728 such that the horizontal portion 771 of the connecting portion 774 is positioned on the bottom side-wall 712 and the horizontal portion 786 of the hooking portion 784 is positioned on the protrusion 732. The vertical portion 787 of the hooking portion 784 extends into the indentation 722.

According to the optical fiber adapter of the present disclosure, the hooking portion 784 will hook on to the indentation 722 when a pull force is exerted on the shutter member 770. Consequently, the hooking portion 784 may prevent the shutter member 770 from being pulled out of the main body 710.

According to the optical fiber adapter of the present disclosure, there is no need to detach the shutter member 770 from the main body 710 prior to inserting the optical fiber connector 600 into the main body 710. When the connector 600 is inserted into the main body 710, it will push down the elastic shutter plate 772 to the gap between the connector 600 and the bottom side-wall 712 of the main body 710. Upon pulling out the connector 600, the elastic shutter plate 772 will quickly spring up to an original position to obstruct the light beams emitted from the cylinder 740 as a result of elasticity. As a result, the occurrence of exposure to the harmful light beams may be avoided.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
   a main body having an accommodation room defined by a first wall, a second wall, a third wall and a fourth wall, the first wall facing the third wall and connecting with the second and fourth walls, wherein an indentation is formed within the accommodation room and on the third wall; and
   an elastic shutter member, including:
      two fixing portions positioned within the accommodation room and on the third wall;
      a shutter plate;
      a connecting portion connecting the fixing portions with the shutter plate; and
      a hooking portion positioned within the accommodation room, wherein the hooking portion extends from the connecting portion to hook on to the indentation on the third wall;
      wherein the shutter plate extends from the connecting portion and into the accommodation room.

2. The optical fiber adapter as claimed in claim 1, wherein the hooking portion has a horizontal portion extending from the connecting portion and a vertical portion extending from the horizontal portion and into the indentation on the third wall.

3. The optical fiber adapter as claimed in claim 1, wherein the hooking portion is positioned between the fixing portions.

4. The optical fiber adapter as claimed in claim 1, wherein two protrusions are formed on the third wall, each of the protrusions comprising:
   a vertical portion extending from the third wall; and
   a horizontal portion extending from the vertical portion, wherein a gap is formed between the horizontal portion and the third wall;
   wherein each of the fixing portions has a side and each of the sides is positioned between the third wall and the horizontal portion of one of the protrusions.

5. The optical fiber adapter as claimed in claim 1, further comprising a stop protrusion formed on the third wall to stop the fixing portions from being further moved into the accommodation room.

6. The optical fiber adapter as claimed in claim 1, wherein the shutter member is made of metal.

7. The optical fiber adapter as claimed in claim 1, wherein the optical fiber adapter is an SC type optical fiber adapter.

8. The optical fiber adapter as claimed in claim 1, wherein the indentation extends through the third wall to the outside of the accommodation room.

9. The optical fiber adapter as claimed in claim 2, further comprising:
   a protrusion formed within the accommodation room and on the third wall,
   wherein the connecting portion has a horizontal portion connecting with the shutter plate and an upward portion extending upward from the horizontal portion, the horizontal portion of the hooking portion extends horizontally from the upward portion of the connecting portion, the horizontal portion of the hooking portion is positioned on the protrusion formed on the third wall.

10. A shutter member for an optical fiber adapter, the optical fiber adapter including a main body having an accommodation room defined by a first wall, a second wall, a third wall and a fourth wall, the first wall facing the third wall and connecting with the second and fourth walls, wherein an indentation is formed within the accommodation room and on the third wall, the shutter member comprising:
   two fixing portions;
   a shutter plate;
   a connecting portion connecting the fixing portions with the shutter plate; and
   a hooking portion having a horizontal portion extending from the connecting portion and a vertical portion extending from the horizontal portion;
   wherein the shutter plate is configured to extend into the accommodation room, the fixing portions are configured to be positioned within the accommodation room and on the third wall, and the vertical portion is configured to extend into the indentation on the third wall.

11. The shutter member as claimed in claim 10, wherein the hooking portion is positioned between the fixing portions.

12. The shutter member as claimed in claim 10, wherein the shutter member is made of metal.

13. The shutter member as claimed in claim 10, wherein the connecting portion has a horizontal portion connecting with the shutter plate and an upward portion extending upward from the horizontal portion, the horizontal portion of the hooking portion extends horizontally from the upward portion of the connecting portion.

* * * * *